United States Patent
Rohloff

[11] 3,841,263
[45] Oct. 15, 1974

[54] SEED TREATING DEVICE FOR DRILL FILL AUGERS AND THE LIKE

[76] Inventor: Bennett W. Rohloff, Box 572, Weyburn, Saskatchewan, Canada

[22] Filed: Nov. 13, 1972

[21] Appl. No.: 306,173

[52] U.S. Cl. .............................. 118/303, 134/132
[51] Int. Cl. ............................................... B05c 5/00
[58] Field of Search ....... 118/303, 307, 24, 19, 316; 134/132; 259/7

[56] References Cited
UNITED STATES PATENTS

| | | |
|---|---|---|
| 2,264,048 | 11/1941 | McMahon et al. ................. 118/307 |
| 2,824,022 | 2/1958 | Sucetti ........................... 118/303 X |
| 3,130,070 | 4/1964 | Potters et al. .................... 118/303 X |
| 3,662,707 | 5/1972 | Dreve, Jr. ........................ 118/307 X |
| 3,734,777 | 5/1973 | Bratschitsch ..................... 118/303 X |

Primary Examiner—John P. McIntosh
Attorney, Agent, or Firm—Stanley G. Ade

[57] ABSTRACT

Liquid chemical is pumped from a container through a metering valve to a small spray nozzle on the wall of an auger tube. The pump only operates when the auger is actuated so that seed is only treated as required. The device is clamped to the side of a truck box or the like and is pivotally supported so that as the box is raised or lowered the device remains level.

1 Claim, 2 Drawing Figures

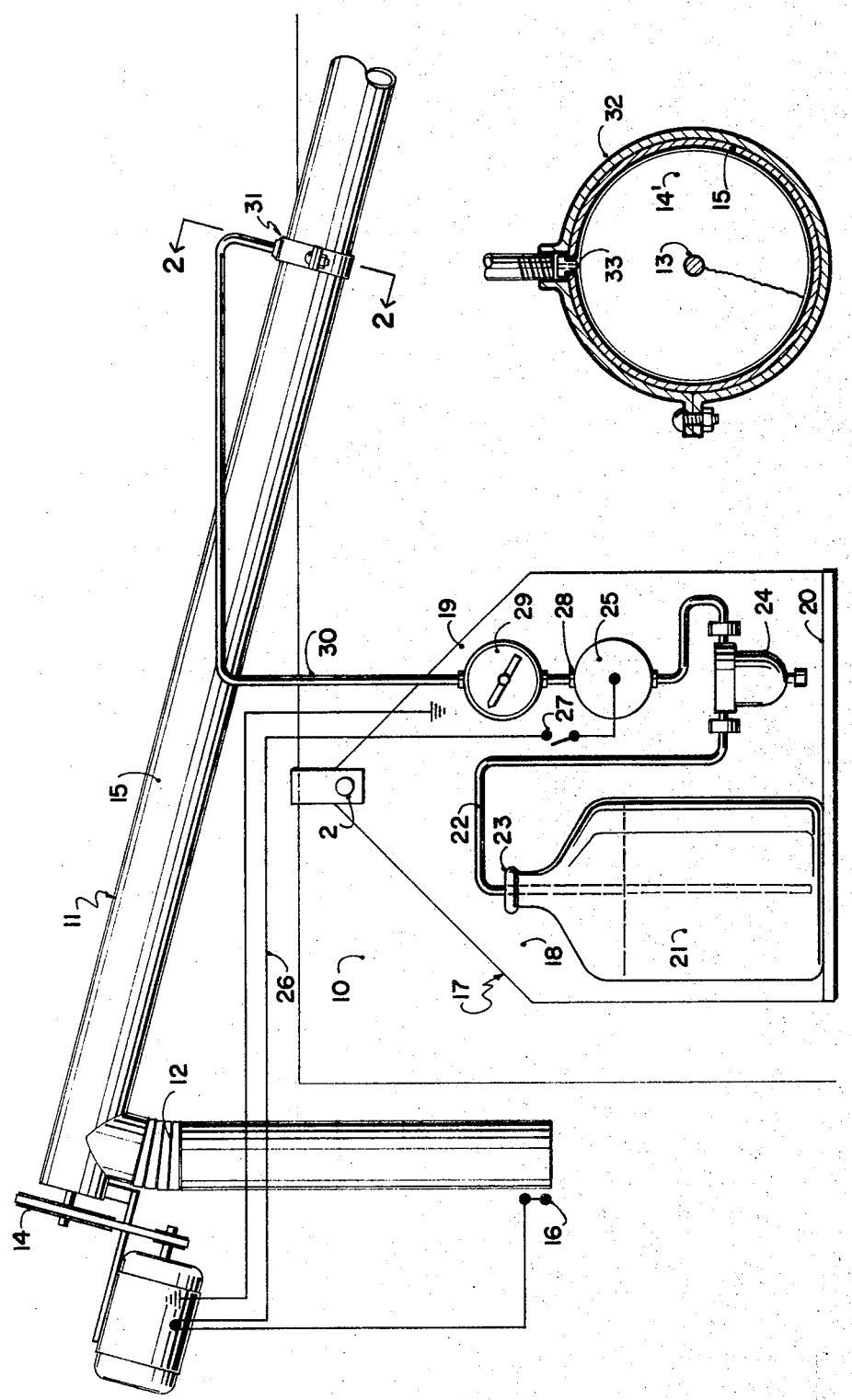

SEED TREATING DEVICE FOR DRILL FILL AUGERS AND THE LIKE

BACKGROUND OF THE INVENTION

This invention relates to new and usefule improvements in devices to treat seed with liquid chemical prior to use.

Normally a farmer has to purchase treated seed from a commercial establishment which means it then has to be stored in bins or the like until required. This results in contaminated bins and truck boxes which have to be cleaned. Furthermore once treated, it is difficult to vary the amount of chemical on the seed.

Alternatively, the farmer attempts to treat the seed himself, one method of which includes a bottle of chemical which hung above a grain auger intake so that the chemical flows into the auger as the auger is rotated. This is wasteful and costly and difficult to control.

A further method is to use a powder which is sprinkled into the seeder box by hand which is also time consuming and inaccurate and extremely hazardous under windy conditions.

SUMMARY OF THE INVENTION

This invention overcomes these disadvantages by providing a pump for a container of liquid chemical in which the output may be varied by an adjustable metering valve. A conduit extends between the pump and a small spray nozzle mounted in the wall of the auger tube. By ensuring that the pump operates only when the auger is in use, the seed is only treated as required and immediately before use.

The present device is extremely accurate so that correct seed treatment can be applied and is thus considerably more economical and efficient in the use of chemical.

The principal object and essence of the invention is therefore to provide a device of the character herewithin described which enables a farmer to treat seed with a liquid chemical immediately prior to loading same into the seeder box.

Another object of the invention is to provide a device of the character herewithin described which eliminates contaminated truck boxes and contaminated storage bins.

A still further object of the invention is to provide a device of the character herewithin described in which the amount of seed treatment can be varied within limits as required.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a side elevation of the invention mounted upon a truck which is shown schematically.

FIG. 2 is a cross sectional view of the auger tube showing the mounting of the discharge nozzle therein.

In the drawings like characters of reference indicate corresponding parts in the different figures.

DETAILED DESCRIPTION

Proceeding therefore to describe the invention in detail, reference character 10 illustrates schematically one side of a truck box, said truck box being conventional and being mounted upon a truck which normally permits the truck box to be raised or lowered as required depending upon the amount of seed within the truck box.

A drill fill auger assembly collectively designated 11 is shown schematically. This is normally mounted upon the truck box and includes an intake end within the truck box (not illustrated) and a vertical flexible discharge assembly 12 situated at the other end of the auger assembly 11. The auger shaft 13 is driven via a pulley wheel 14 upon one end of the shaft which is connected to a source of power (not illustrated). An auger flighting 14' is mounted upon the auger shaft, said shaft and flighting rotating within a cylindrical auger tube 15 in the conventional manner.

Normally a switch 16 is provided on the discharge end of the discharge assembly 12 so that the source of power which usually takes the form of an electric motor, can be stopped and started by the operator as the device is being used to fill a seed drill (not illustrated).

My device collectively designated 17 consists of a support assembly 18 which includes a vertical panel 19 extending upwardly from a horizontal base panel 20.

The base panel provides means to support a detachable liquid chemical container 21 in the form of a bottle or the like within which is inserted a plastic tube 22 through a stopper 23, the plastic tube extending to adjacent the base of the container 21.

This plastic tube 22 extends to a sediment bowl assembly 24 and then to an electric pump 25 which may take the form of an automobile fuel pump.

Electrical conductors 26 extend between the fuel pump and the source of electrical energy (not illustrated) and is designed to be actuated by switch 16 concurrently with the auger.

If necessary a further switch 27 may be inserted within the electrical conduits 26 so that the pump 25 may be disconnected if it is so desired to utilize the auger without the application of chemical to the seed therein.

The discharge side 28 of the pump extends to a variable metering valve 29 which is conventional in construction. A conduit 30 extends from the metering valve 29 to the nozzle assembly collectively designated 31. This nozzle assembly includes a clamp 32 surrounding the auger tube and a discharge nozzle 33 held within the clamp and extending through the wall of the auger tube 15.

In operation, as the auger is rotated by the source of power, the pump 25 pumps chemical from the container 21 through the sediment trap bowl 24 and thence to the metering valve 29. Depending upon the setting of the metering valve, the liquid chemical is pumped through the conduit 30 to the nozzle 33 and onto the seed grain being elevated by the auger assembly.

By this means, complete mixing is provided and only the seed required immediately is treated by the liquid chemical.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A seed treating device for liquid chemicals in conjunction with a truck box or the like and a drill fill auger assembly which includes an auger tube and a source of electrical power; comprising in combination a supporting component, said supporting component including a base and a vertical member extending upwardly from said base, a liquid chemical container mounted upon said base, a pump mounted on said supporting component and being operatively connected to said container, a conduit extending between the pump output side and the associated auger tube, and a nozzle secured to and extending through the wall of said tube intermediate the ends thereof and being connected to said conduit, said supporting component being pivotally supported by the upper side of said vertical member, upon said truck box whereby said supporting component remains in the same horizontal plane regardless of the angle of inclination of said truck box, and means to connect said source of power to said auger and to said pump for simultaneous operation of said auger and said seed treating device.

* * * * *